(12) United States Patent
Simon et al.

(10) Patent No.: US 7,930,902 B2
(45) Date of Patent: Apr. 26, 2011

(54) MECHANISM FOR CONVEYING AN ARTICLE

(75) Inventors: Jonathan S. Simon, Pleasant Valley, CT (US); William P. Jacobsen, Bolton, CT (US)

(73) Assignee: Emhart Glass S.A., Cham (CH)

( * ) Notice: Subject to any disclaimer, the term of this patent is extended or adjusted under 35 U.S.C. 154(b) by 173 days.

(21) Appl. No.: 11/475,374

(22) Filed: Jun. 26, 2006

(65) Prior Publication Data

US 2007/0297874 A1 Dec. 27, 2007

(51) Int. Cl.
*C03B 9/44* (2006.01)
*C03B 9/453* (2006.01)

(52) U.S. Cl. .......................... 65/260; 198/430

(58) Field of Classification Search ............ 65/260; 700/158, 157; 198/430
See application file for complete search history.

(56) References Cited

U.S. PATENT DOCUMENTS

| | | | |
|---|---|---|---|
| 4,456,462 A | 6/1984 | Jones et al. | |
| 5,160,015 A * | 11/1992 | Perry et al. | 198/468.01 |
| 5,429,651 A * | 7/1995 | Bolin | 65/241 |
| 5,904,745 A * | 5/1999 | Nafziger et al. | 65/29.1 |
| 5,950,799 A | 9/1999 | Peltier et al. | |
| 6,295,072 B1 | 9/2001 | Pon et al. | |
| 6,701,210 B2 | 3/2004 | Heber et al. | |
| 7,426,990 B2 * | 9/2008 | Kammonen | 198/430 |
| 2003/0078692 A1 | 4/2003 | Heber et al. | |
| 2005/0071021 A1 | 3/2005 | Weinhofer | |
| 2005/0193773 A1 * | 9/2005 | Winkelhake et al. | 65/239 |

FOREIGN PATENT DOCUMENTS

| | | |
|---|---|---|
| EP | 1318116 | 6/2003 |
| RU | 2241689 | 5/2003 |
| WO | WO 2005085145 A1 * | 9/2005 |

OTHER PUBLICATIONS

Rothbart, Harold A., Cam Design Handbook, 2004, McGraw-Hill, p. 109, p. 187-189.*

* cited by examiner

*Primary Examiner* — Matthew J Daniels
*Assistant Examiner* — Cynthia Szewczyk
(74) *Attorney, Agent, or Firm* — Reinhart Boerner Van Deuren s.c.

(57) ABSTRACT

A pusher mechanism for pushing bottles formed in an I.S. machine from a dead plate to a conveyor. The pusher mechanism includes a pusher finger assembly which is supported by a housing and is movable about an axis of support and about the parallel axis of rotation of the housing. A pair of servo motors effect the desired rotation of the two axes through cam profiles each of which has at least one Bezier curve segment with a parameter of one curve linked to a parameter of the other curve.

9 Claims, 8 Drawing Sheets

FIG. 6

| Arm<br>Cam | Segment 1 | Segment 2 | Segment 3 | Segment 4 | Segment 5 | Segment 6 |
|---|---|---|---|---|---|---|
| time 1 | 0 | match end of previous section | match end of previous section | match end of previous section | match end of previous section | match end of previous section |
| position 1 | home position | match end of previous section | match end of previous section | match end of previous section | match end of previous section | match end of previous section |
| slope 1 | 0 | match end of previous section | match end of previous section | match end of previous section | match end of previous section | match end of previous section |
| coefficient 1 | 1 | variable | variable | variable | variable | variable |
| time 2 | variable | variable | variable | variable | variable | variable |
| position 2 | home position | minimum arm position | variable (greater than or equal to minimum arm position) | nominal release position | maximum arm angle (must be great enough for fingers to retract to clear containers on belt) | rest position |
| slope 2 | 0 | 0 | variable (positive) | effects release velocity for given cam motion time | 0 | 0 |
| coefficient 2 | 1 | variable | variable | variable | variable | variable |

FIG. 7

| Finger Cam | Segment 1 | Segment 2 | Segment 3 |
|---|---|---|---|
| time 1 | 0 | match end of previous section | match end of previous section |
| position 1 | 0 | match end of previous section | match end of previous section |
| slope 1 | 0 | match end of previous section | match end of previous section |
| coefficient 1 | variable | variable | variable |
| time 2 | variable | variable | variable |
| position 2 | variable | maximum finger angle (approx. 90 deg) | 0 |
| slope 2 | variable | 0 | 0 |
| coefficient 2 | variable | variable | variable |

FIG. 9

|  | Arm Segment 1 | Arm Segment 2 | Arm Segment 3 |
|---|---|---|---|
| Arm cam time 2 | time at which finger reaches specified angle phi_c | time at which finger reaches specified angle phi_b | time at which finger reaches specified angle phi_d |

MECHANISM FOR CONVEYING AN ARTICLE

The present invention related to I.S. machines which transform a gob of molten glass into a bottle.

BACKGROUND OF THE INVENTION

Glass bottles are formed in an I.S. machine in a two step process. First a gob of molten glass is formed into a "parison" in a blank station. The skin of the parison is chilled to give the parison sufficient rigidity so that in can be transferred, by an invert mechanism to the blow station. At the blow station blow molds will be closed and the parison will be blown into a bottle. The skin of the bottle will be chilled sufficiently so that it can be transferred to a dead plate by a take out mechanism. At the dead plate, the bottles will be further cooled and then pushed onto a conveyor by a pusher mechanism. Each of these displacements may have very difficult segments where very small variations may have significant importance.

For example, when bottles are being produced at more than 600 per minute on an I.S. Machine, it is very difficult to coordinate the placement of the bottles on the conveyor without causing the bottles to fall. Bottles are deposited on a dead plate, where they will be cooled for short period of time, and then pushed by a pusher mechanism (pusher) through an angle of about 90 degrees onto a moving conveyor. The pusher has a finger assembly which defines a pocket for each of the bottles deposited on the deadplate. The finger assembly is located on the deadplate before the bottles are deposited. A pair of servo motors displaces the pusher pursuant to defined cam profiles and numerous cams are stored in memory to handle a variety of bottles and machine speeds. To vary such displacement, a cam profile will be changed. As the speed of these machines increases, the difficulty involved in controlling the bottles, as they are displaced, increases. One of the most difficult segments of pusher displacement is the displacement of the bottles onto the conveyor and the immediate displacement of the pusher away from the conveyor once the bottles have been properly positioned on the conveyor.

OBJECT OF THE INVENTION

It is accordingly an object of the present invention to provide a control for a displaceable mechanism which will enable an operator to make very precise changes in the displacement profile.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE DRAWINGS

FIG. 6 is a table showing the Bezier parameters for six cam segments of pusher arm movement in accordance with the teachings of the invention;

FIG. 7 a table showing the Bezier parameters for three cam segments of pusher finger movement in accordance with the teachings of the present invention;

FIG. 9 is a table showing the coupling of coupled finger cam motion and arm cam motion.

BRIEF DESCRIPTION OF THE PREFERRED EMBODIMENT

Figure 1:
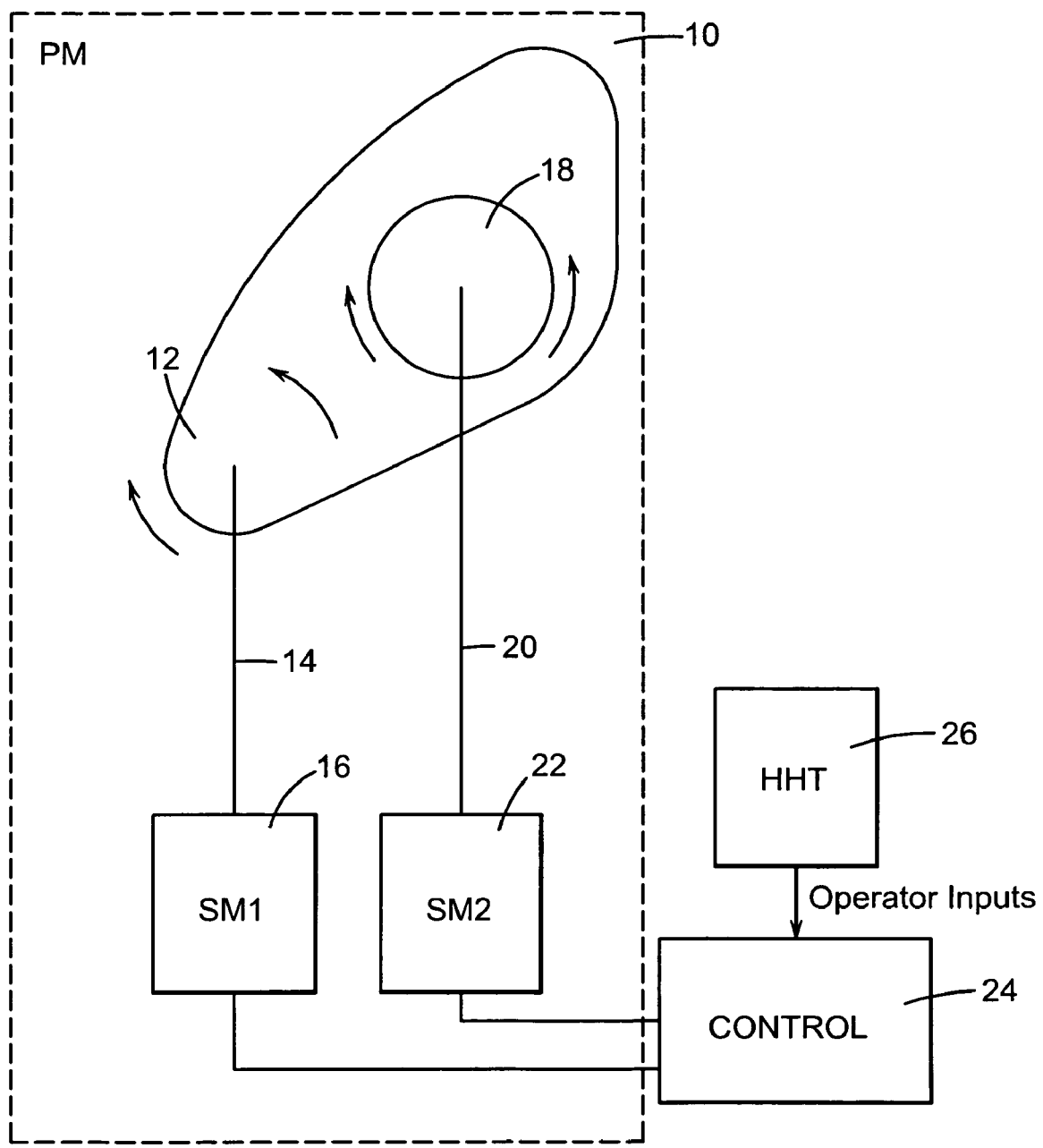
FIG. 1 is a schematic showing of a pusher mechanism for pushing bottles formed in an I.S. machine from a dead plate through an angle of 90 degrees onto a moving conveyor.

A pusher mechanism PM/10 is schematically disclosed in FIG. 1 and includes a pusher housing or arm 12 which is rotatable about a first axis 14 by a first servo motor SM1/16 and a finger assembly or finger 18 which is carried by the pusher housing and is rotatable about a second axis 20 by a second servo motor SM2/22. Each motor is controlled by a suitable motion controller Control/24 via a stored cam which can be altered by Operator Inputs entered by a hand held terminal HHT/26 (or user console). Details of such a mechanism can be seen in pending U.S. patent application Ser. No. 11/351,556, filed Feb. 10, 2006.

Figure 2:
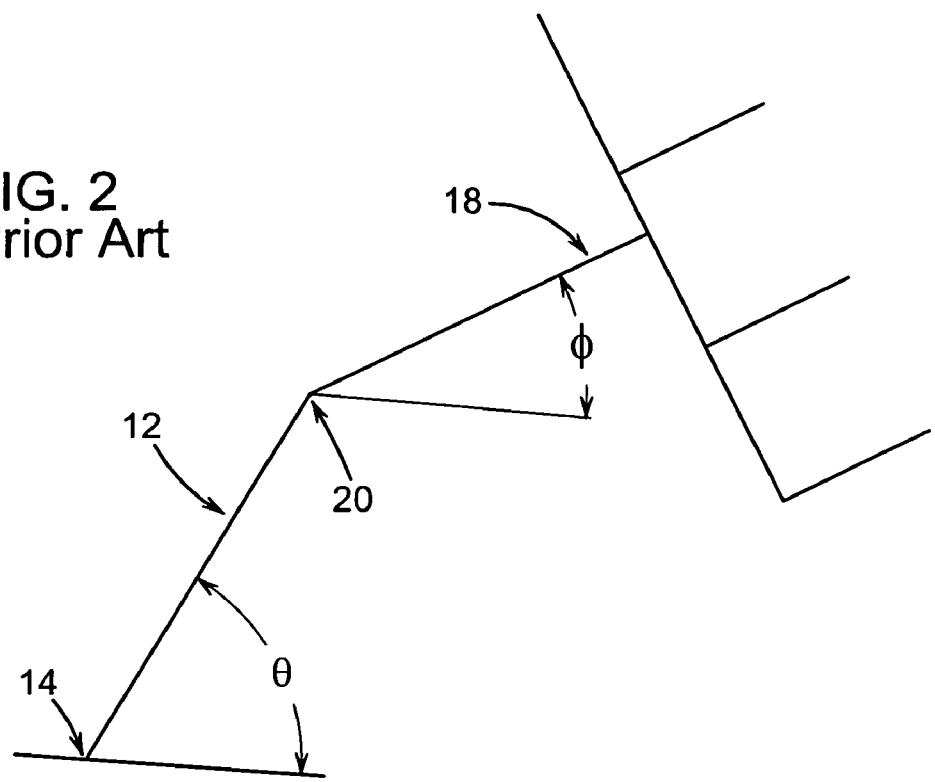
FIG. 2 is a schematic showing of a prior art pusher mechanism which has two axes of motion.
Figure 3:
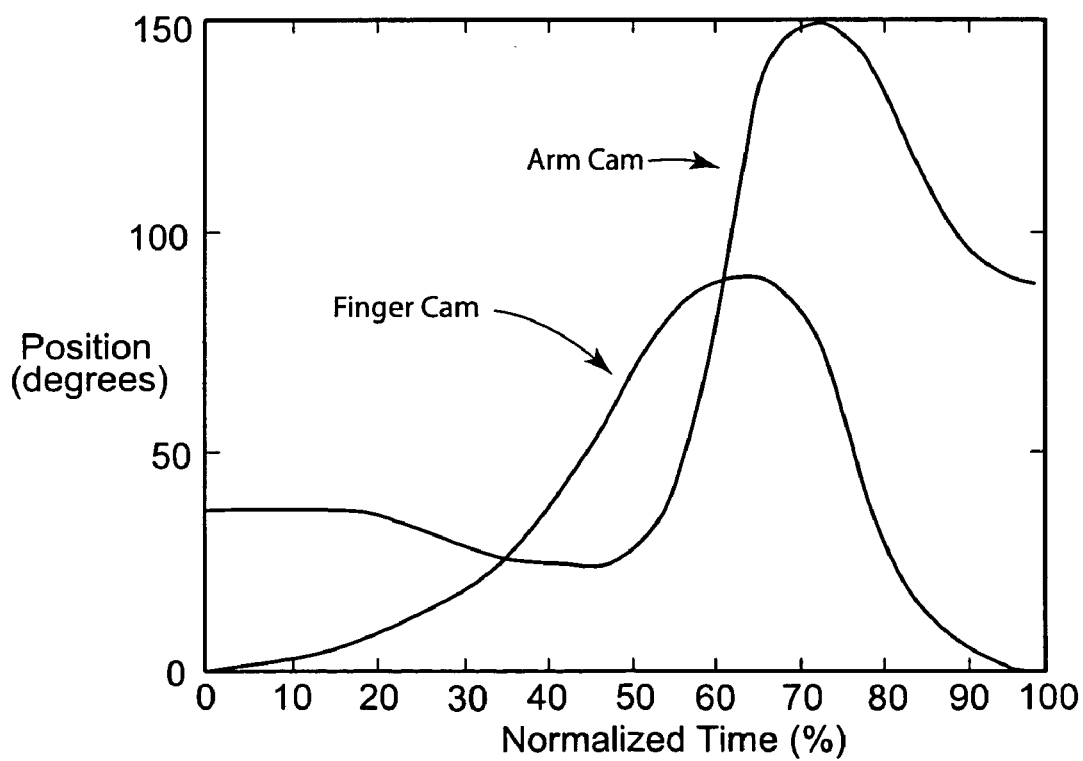
FIG. 3 illustrates two representative cams for the two motions shown in FIG. 2.

The overall motion of the finger assembly is defined by specifying the angular positions of the arm and finger as a function of time as given by the cams $\Phi(t)$ and $\theta(t)$ respectively (FIG. 2). Typical finger and arm cams are shown in FIG. 3.

Figure 4:
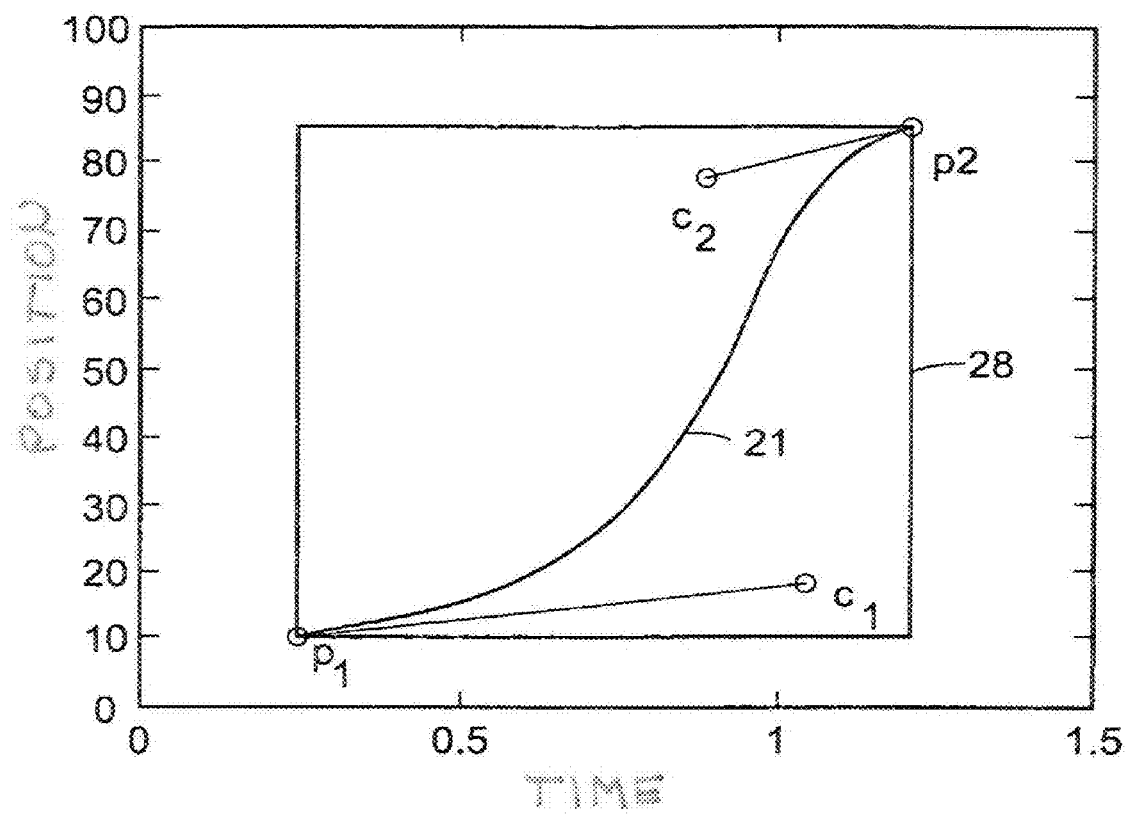
FIG. 4 is an illustration of a Bezier curve.

A Bezier curve is used to represent specific cam segments. A typical representation of a cam segment using a Bezier curve is shown in FIG. 4. The Bezier segment is defined by the location (coordinates) of the two endpoints, P1 and P2, and the two control points C1, and C2. The curve segment is given by the formula:

$$P(Z)=(1-Z)^3 P_1 + 3(1-Z)^2 Z C_1 + 3(1-Z) Z^2 C_2 + Z^3 P_2$$

with $0 \leq Z \leq 1$

In this equation P, P1, C1, C2, and P2 are length two vectors whose first component is time (the horizontal axis) and the second component is the cam position. For fixed end points, the shape of the curve C, connecting P1 and P2 can be modified by changing the location of the control points, C1 and C2. The resulting curve is always tangent to the line P1-C1 at endpoint P1, and is tangent to the line P2-C2 at the endpoint P2. As the length of the line P1-C1 is increased the curve will tend to maintain its initial slope "sticking" to the P1-C1 line longer. Similarly as the length of P2-C2 increases the curve will become approximately tangent to line P2-C2 sooner, "sticking" to the P2-C2 line sooner. To define a Bezier curve segment for the pusher, the end points, P1 and P2, the slope of the cam, M1 and M2 at the endpoints and the lengths L1, L2, of the lines P1-C1 and P2-C2 are specified. The coordinates of the control points C1 and C2, can be computed using:

$$C_1(1) = P_1(1) + \frac{L_1}{\sqrt{1+M_1^2}}$$

$$C_1(2) = P_1(2) + \frac{L_1 M_1}{\sqrt{1+M_1^2}}$$

-continued $$C_2(1) = P_2(1) - \frac{L_2}{\sqrt{1+M_2^2}}$$

$$C_2(2) = P_2(2) - \frac{L_2 M_2}{\sqrt{1+M_2^2}}$$

The location of C1 and C2 is restricted to being inside of the rectangle 28 whose corners are P1 and P2 as shown in FIG. 4. This makes the Bezier segment monotonic. Since the control points lie inside of the rectangle defined by the endpoints P1 and P2, the specified lengths L1 and L2 are normalized to a range of 0 to 1 where the maximum length of 1 places the control points at the boundary of the allowable rectangle. These normalized control point distance values will be referred to as the Bezier coefficients and denoted as alpha 1 ($\alpha$1) and alpha 2 ($\alpha$2). An overall cam is defined by a number of Bezier curves. For each segment of the overall cam, the end points P1 and P2, the end slopes M1 and M2, and Bezier coefficients alpha 1 ($\alpha$1) and alpha 2 ($\alpha$2) must be specified. The position value P1($i$) of the ith segment equals the position value P2($i$-1) of the end point of the previous segment, and M1($i$) of the ith segment equals the slope M2($i$-1) of the previous segment. For an overall cam, made up of N segments, N+1 position values, N+1, slope values, and 2N (both ends of each segment) Bezier coefficient values will be specified.

Figure 5:
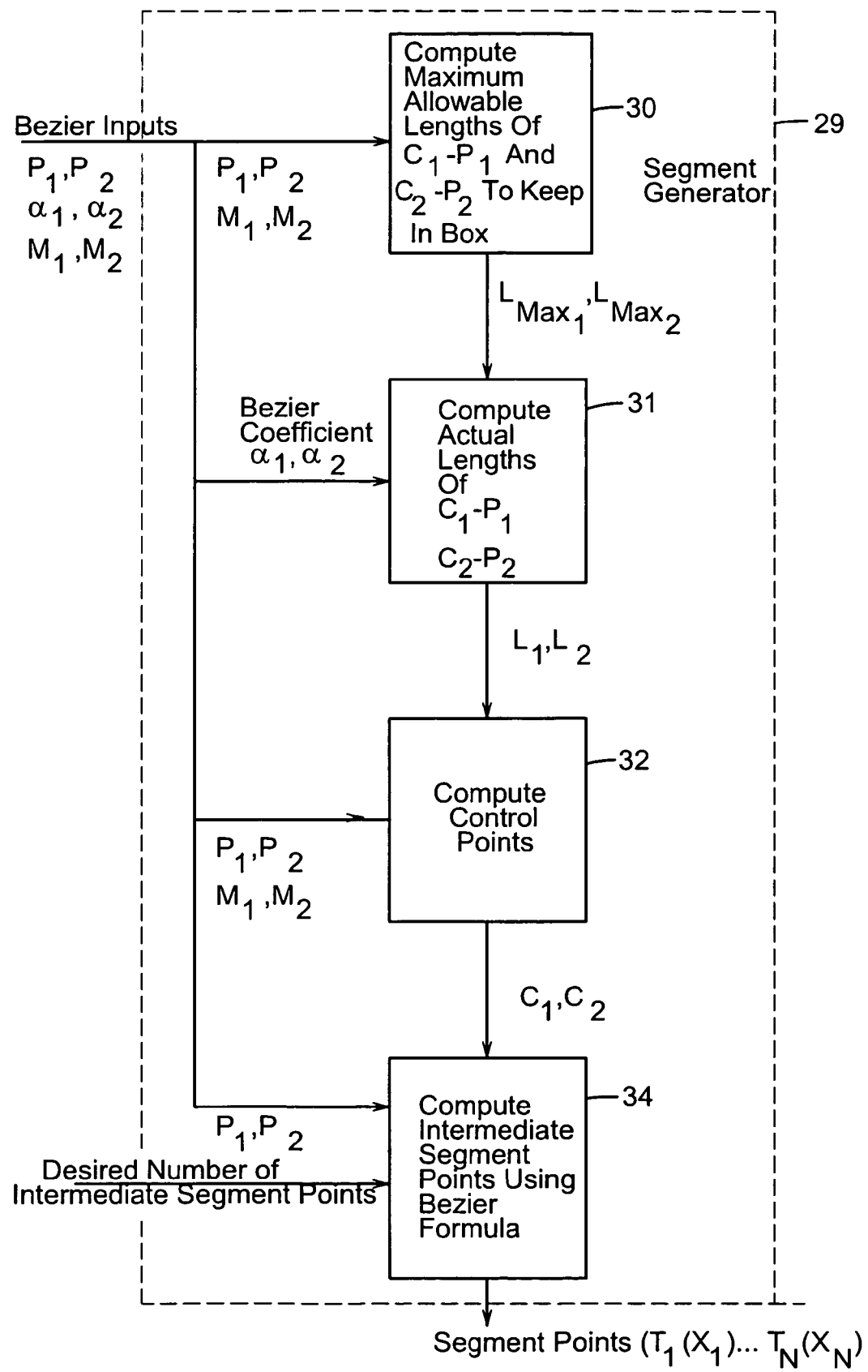
FIG. 5 is a logic diagram illustrating how Bezier inputs are converted to the Bezier control points and then into intermediate segment points.

FIG. 5, illustrates a logic diagram of a Segment Generator 29 for defining the requisite intermediate points of a Bezier segment. The required Bezier inputs are P1,P2,$\alpha$1,$\alpha$2,M1, M2. P1,P2,M1,M2 are supplied to Compute Maximum Allowable Lengths of C1-P1 and C2-P2 To Keep In Box 30 and $L_{max1}$, $L_{max2}$, the maximum lengths are computed and supplied, with $\alpha$1, $\alpha$2 to Compute Actual Lengths Of C1-P1, C2-P2 31. These actual lengths L1, L2 are supplied with P1,P2,M1,M2 to Compute Control Points 32 which define the control points C1,C2. These control points are supplied, with the Desired Number Of Intermediate Set Points (which may be input by the operator) to Compute Intermediate Segment Points Using Bezier Formula 34 to define the segment. This process, which outputs the segment points (both the end points and the computed intermediate points, i.e., pairs of time and position values—$t_1(x_1) \ldots t_n(x_n)$), along the Bezier curve segment, for each Bezier segment.

Individual points (pairs of time and position values) are provided by evaluating Equation at 1 for a sequence of values of the argument z ranging between 0 and 1. In general, even if z is incremented with uniform spacing, the sequence of time values returned by Equation 1 will not be uniformly spaced. This is an issue because typical motion control software requires that the points along a cam are uniformly spaced. To resolve this, points are first computed along each segment of the overall cam using Equation 1. Then the points are concatenated for the individual segments to form an overall table of time, position values representing the cam. Finally, new time and position value pairs are interpolated at equal time increments. A cubic spline interpolation has been used for this purpose. This has the added benefit of making the second derivatives of the interpolated curve continuous while also preserving the original continuity properties (continuous position and velocity).

The Arm Cam and Finger Cam are each broken into a number of Bezier segments. The arm cam, which controls the displacement of the arm from the bottle pick up position to the rest position (the position prior to the bottle deposit location) is broken into 6 Bezier segments as follows:

Arm Segment 1: Arm angle remains constant
Arm Segment 2: Arm rotates backwards (arm angle decreases)
Arm Segment 3: Arm rotates slowly forward moving containers across dead plate
Arm Segment 4: Arm accelerates forward getting containers up to belt speed
Arm Segment 5: Arm decelerates as fingers retract
Arm Segment 6: Arm jack knifes back to rest position
To maintain the basic qualitative features of a successful cam, the Bezier parameters assigned for each segment of the arm cam are shown in FIG. 6.

The finger cam, which controls the displacement of the arm from the bottle pick up position to the rest position (the position prior to the bottle deposit location) is broken into 3 Bezier segments as follows:

Finger Segment 1: Fingers scoop up containers and complete initial rotation
Finger Segment 2: Fingers accelerate as containers are pushed onto belt
Finger Segment 3: Fingers jackknife back to rest position.
Bezier parameters for each segment of the arm cam be assigned as shown in FIG. 7.

Figure 8:
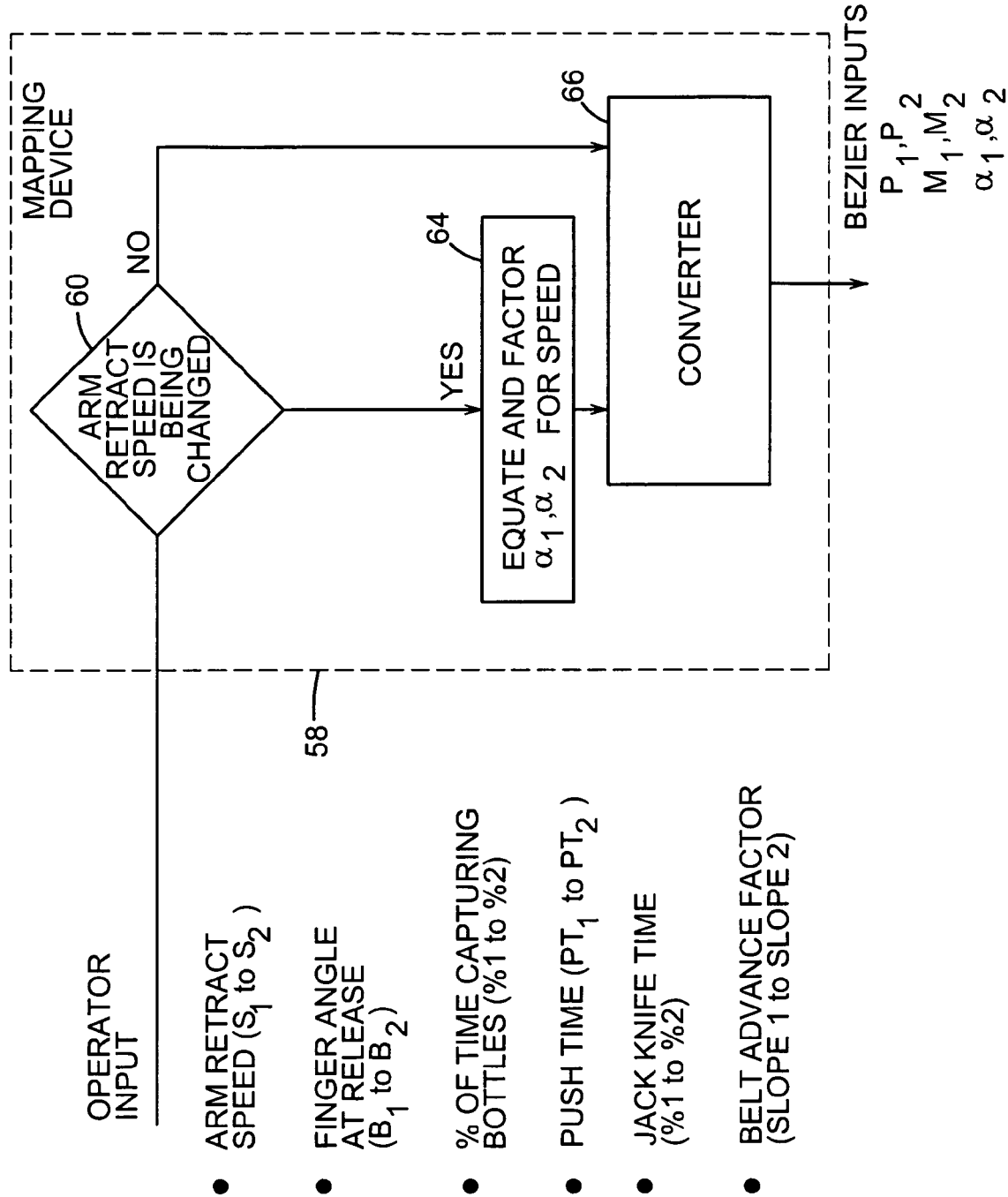
FIG. 8 is a logic diagram showing the conversion of operator inputs to Bezier inputs.

When an operator is observing pusher performance he will observe structure related variables. As shown in FIG. 8, some of the variables that may be observed in a pusher mechanism are 1. Arm Retract Speed ($S^1$ to $S^2$), i.e., how fast the pusher arm retracts after bottles are released to the conveyor; 2. Finger Angle At Release ($\beta_1$ to $\beta_2$), i.e., the bottles should be in the desired straight line; 3. Percent Of Time Capturing Bottles (%1 to %2), i.e., how much can push time be decreased to increase dead plate time; 4. Push Time ($PT_1$ to $PT_2$), i.e., bottles moving at conveyor speed at release; 5. Jack Knife Time (%1 to %2), i.e., time from "retract" to dead plate; and 6. Belt Advance Factor (Slope 1 to Slope 2). Through observation, the desired range through which these variables should vary can be defined.

These inputs are supplied to a Mapping Device 58. When the Operator Inputs are received by the Converter 66, the Converter converts these Operator Inputs, using a predefined mapping (each performance related input throughout its defined range) to Bezier Inputs P1,P2,M1,M2,$\alpha$1,$\alpha$2 which will be processed to compute the new control and end points.

It has been found that linking the Bezier coefficients and the Arm Retract Speed in a Bezier segment may be advantageous. Accordingly, when the Arm Retract Speed Is Being Changed 60, linkage is desired between the Bezier coefficients and the Arm Retract Speed. The Mapping Device will accordingly Equate And Factor $\alpha$1, $\alpha$2 For Speed 64 (keep these coefficients equal while changing them pair wise as a function of speed). For example, as the Arm Retract Speed proceeds from (20 to 80), the Bezier coefficients $\alpha$1, $\alpha$2 will be kept equal and will vary through their ranges (0.2 to 0.8) at the same rate as the speed changes. For example, should the speed be changed to 30, both coefficients would be changed to 0.3.

Linkage may also be desirable between cams. For example, the finger cam motion may be coupled to the arm cam motion so that they will continue to move in a coordinated fashion as the shape of one of the curves is varied. The parameters which have been tied together are shown in FIG. 9.

Figure 10:
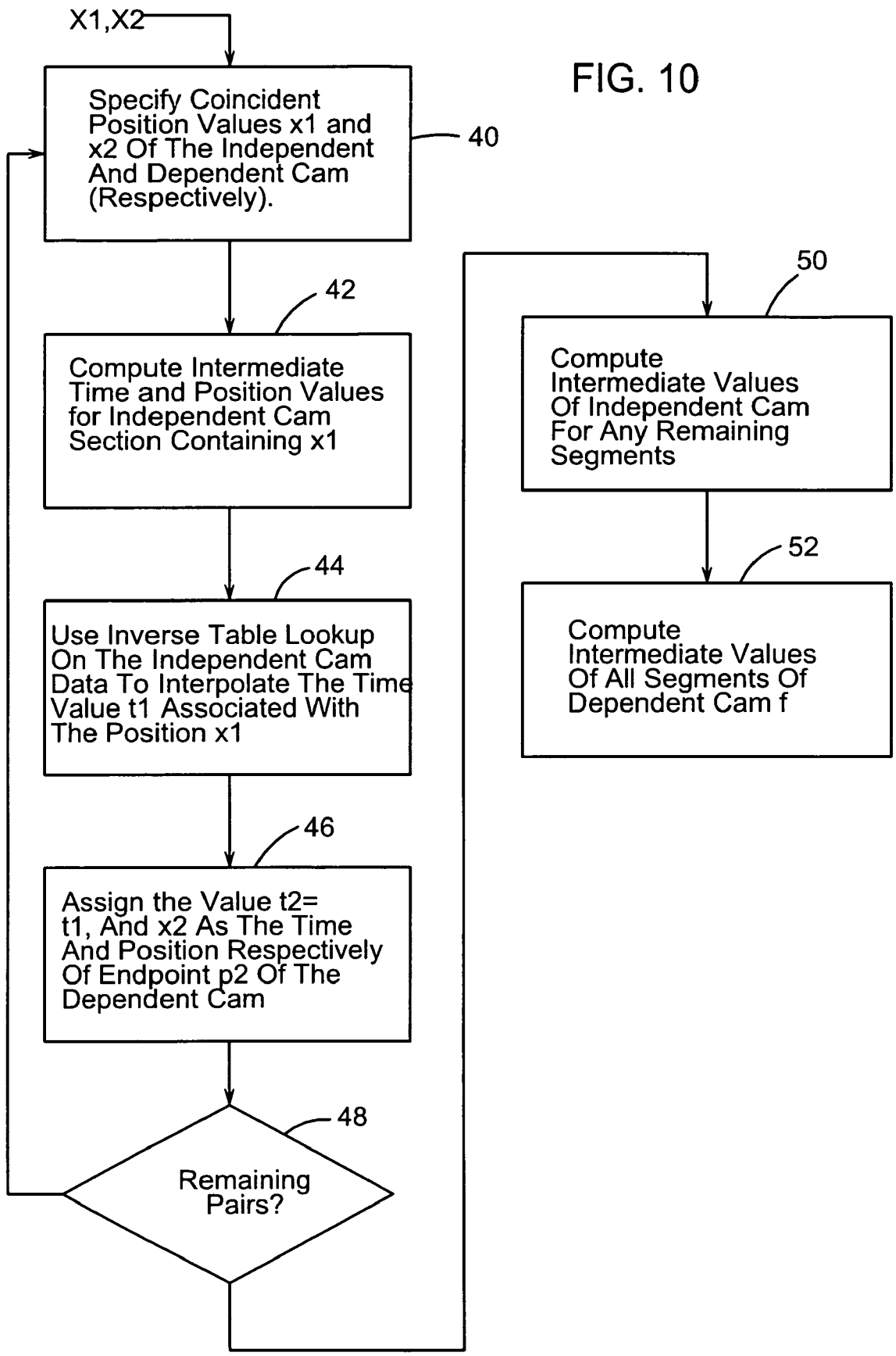
FIG. 10 is a logic diagram illustrating the linking of arm and finger parameters.

As shown in FIG. 10, two cams to be coupled are hereinafter referred to as the independent and dependent cams. Where, for example, it is desired to enforce the requirement that when the independent cam reaches the value X1, the end point P2, of the dependent cam will have the value X2, this can be accomplished by executing the following steps illustrated in FIG. 8:

1. Specify Coincident Position Values x1 and x2 Of The Independent And Dependent Cam (Respectively) 40;
2. Compute Intermediate Time And Position Values For Independent Cam Section Containing x1 42;
3. Use Inverse Table Lookup On The Independent Cam Data To Interpolate The Time value t1 Associated With The Position x1 44;
4. Assign The Value t2=t1, and x2 As The Time And Position Respectively Of Endpoint P2 Of The Dependent Cam 46;
5. Repeat Steps 1-4 for any Remaining Pairs? 48 of coupled position values;
6. Compute Intermediate Values Of: The Independent Cam For Any Remaining Segments 50 not already computed in the above steps in the usual way; and
7. Compute Intermediate Values Of All Segments Of Dependent Cam f 52. Such structure could conveniently be located within the Compute Intermediate Segment Points Using Bezier Formula 34 block of the Segment Generator 29.

While a two-axis mechanism has been disclosed as the preferred embodiment, this technology can be used with a single or two-axis mechanisms, such as an invert mechanism or takeout mechanism of an I.S. machine.

The invention claimed is:

1. A mechanism for conveying an article comprising
a first servo operated member,
a first servo motor for operating said first servo operated member in accordance with a cam profile,
said cam profile having a plurality of continuous Bezier curve segments each defined by Bezier curve segment inputs,
wherein the first servo operated member further comprises a second servo operated member,
a second servo motor for operating said second servo operated member in accordance with a second cam profile,
said second cam profile having a plurality of continuous Bezier curve segments each defined by Bezier curve segment inputs,
an operator data entry device for entering at least one physically observable structure related performance variable having a predetermined range, wherein said at least one physically observable structure related performance variable is one of arm retract speed, finger angle at release, percent of time capturing bottles, jack knife time, and belt advance factor, and
a control configured as
a mapping device for receiving said performance variable and determining, for the received performance variable, Bezier curve segment inputs, and
a segment generator for receiving said Bezier curve segment inputs and for computing intermediate segment points for at least one of the Bezier curve segments,
wherein the mechanism is a pusher mechanism for pushing bottles formed in an I.S. machine through an angle of about 90 degrees from a dead plate onto a moving conveyor, the pusher mechanism including an arm member rotatable about a first axis and a finger member, rotatable about a second axis, spaced apart from said first axis, and supported by said arm member, and wherein the first servo operated member is the arm of the pusher mechanism, and
wherein the second servo operated member comprises said finger member.

2. A mechanism for conveying an article according to claim 1, wherein the Bezier inputs include the end and control points of a segment and the Bezier coefficients for the segment, and
said mapping device further comprises means for changing Bezier coefficients pair wise as a function of the change in the performance variable.

3. A mechanism according to claim 1, wherein a Bezier curve segment is defined by Bezier curve segment inputs including end points P1, P2 and said segment generator includes means for restricting the Bezier curve segment to within a rectangle defined by said end points.

4. A mechanism for conveying an article according to claim 1, wherein said segment generator includes means for linking a parameter of one of the Bezier segments for one of said cam profiles with a parameter of one of the Bezier segments for the second one of said cam profiles.

5. A mechanism for conveying an article comprising
a finger member rotatable about an axis,
a first servo motor for rotating said finger member in accordance with a first cam profile,
said first cam profile having a plurality of continuous Bezier curve segments each defined by Bezier curve segment inputs,
an arm member rotatable about a second axis and supporting said finger member,
a second servo motor for rotating said arm member in accordance with a second cam profile,
said second cam profile having a plurality of continuous Bezier curve segments each defined by Bezier curve segment inputs,
an operator data entry device for entering at least one physically observable performance variable having a predetermined range, wherein said at least one physically observable performance variable is one of arm retract speed, finger angle at release, percent of time capturing bottles, jack knife time, and belt advance factor,
a mapping device for receiving the entered performance variable and determining, for the received performance variable, Bezier curve segment inputs, and
a segment generator for receiving said Bezier curve segment inputs and for computing intermediate segment points for Bezier curve segments of said first and second cam profiles.

6. A mechanism for conveying an article according to claim 5, wherein the mechanism is a pusher mechanism for pushing bottles formed in an I.S. machine through an angle of about 90 degrees from a dead plate onto a moving conveyor and each of the Bezier curve segments is defined by the following Bezier curve segment inputs: end points P1, P2 slopes M1, M2, and Bezier coefficients $\alpha 1$, $\alpha 2$.

7. A mechanism for conveying an article according to claim 6, wherein said mapping device further comprises means for changing Bezier coefficients pair wise in response to a change in the performance variable.

8. A mechanism for conveying an article according to claim 5, wherein a Bezier curve segment is defined by Bezier curve segment inputs including end points P1, P2 and said segment generator includes means for restricting a Bezier curve segment to a rectangle defined by end points P1, P2.

9. A mechanism for conveying an article according to claim 5, wherein said segment generator includes means for linking a parameter of one of the Bezier segments for one of said cam profiles with a parameter of a Bezier segment for the other one of said cam profiles.

* * * * *

UNITED STATES PATENT AND TRADEMARK OFFICE
CERTIFICATE OF CORRECTION

| | | |
|---|---|---|
| PATENT NO. | : 7,930,902 B2 | Page 1 of 1 |
| APPLICATION NO. | : 11/475374 | |
| DATED | : April 26, 2011 | |
| INVENTOR(S) | : Jonathan S. Simon and William P. Jacobsen | |

It is certified that error appears in the above-identified patent and that said Letters Patent is hereby corrected as shown below:

Column 1, Line 5:

"The present invention related to I.S. machines" should read --The present invention relates to I.S. machines--.

Column 5, Line 15:

"Intermediate Values Of: The Independent" should read --Intermediate Values Of The Independent--.

Signed and Sealed this

Third Day of January, 2012

David J. Kappos
*Director of the United States Patent and Trademark Office*